US011308518B2

(12) United States Patent
McDevitt

(10) Patent No.: US 11,308,518 B2
(45) Date of Patent: Apr. 19, 2022

(54) SYSTEMS AND METHODS FOR DYNAMICALLY DETERMINING PROMOTIONS ASSOCIATED WITH DIGITAL COUPONS

(71) Applicant: Verizon Patent and Licensing Inc., Basking Ridge, NJ (US)

(72) Inventor: Patrick McDevitt, Hanover, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 982 days.

(21) Appl. No.: 14/226,002

(22) Filed: Mar. 26, 2014

(65) Prior Publication Data

US 2015/0278864 A1    Oct. 1, 2015

(51) Int. Cl.
*G06Q 30/02*    (2012.01)

(52) U.S. Cl.
CPC ..... *G06Q 30/0261* (2013.01); *G06Q 30/0267* (2013.01)

(58) Field of Classification Search
None
See application file for complete search history.

(56) References Cited

U.S. PATENT DOCUMENTS

| | | | | |
|---|---|---|---|---|
| 5,905,246 A * | 5/1999 | Fajkowski | | G06Q 20/387 |
| | | | | 235/375 |
| 10,451,432 B2 * | 10/2019 | Roberts | | G06Q 30/0267 |
| 2001/0049627 A1 * | 12/2001 | Simpson | | G06Q 30/02 |
| | | | | 705/14.12 |
| 2007/0174259 A1 * | 7/2007 | Amjadi | | G06F 17/30864 |
| 2009/0061884 A1 * | 3/2009 | Rajan | | G06Q 30/02 |
| | | | | 455/445 |
| 2010/0042469 A1 * | 2/2010 | Chandrasekar | .... | G06Q 30/0256 |
| | | | | 705/14.54 |
| 2011/0190009 A1 * | 8/2011 | Gerber, Jr. | | H04L 63/0407 |
| | | | | 455/456.3 |

(Continued)

FOREIGN PATENT DOCUMENTS

EP    2866184 A1 *   4/2015    ......... G06Q 30/0265

OTHER PUBLICATIONS

Gold, Lilly, "New Web 2.0 Site Allows Users to Create, Send Virtual Scratch-and-Win Game Cards for Free", prweb.com, Apr. 26, 2007, archived on Aug. 21, 2008, https://web.archive.org/web/20080821030336/https://www.prweb.com/releases/web2-0/sweepstakes/prweb522060.htm (Year: 2008).*

(Continued)

*Primary Examiner* — Kambiz Abdi
*Assistant Examiner* — Scott Snider

(57) ABSTRACT

Systems and methods are provided for increasing sales profits by dynamically determining a promotion associated with a coupon. The promotion may be determined and delivered to a mobile device once the mobile device is in a geographic location associated with the coupon. By allowing advertisers to change or decide promotions in real-time, demand may be smoothed and profits may be maximized. When the mobile device is in the location associated with the coupons, advertisers can use a variety of factors including location, time of day, current sales or redemption data, or information known about the mobile device to set or adjust an ideal promotion for the current situation.

18 Claims, 8 Drawing Sheets

(56) References Cited

U.S. PATENT DOCUMENTS

| | | | | |
|---|---|---|---|---|
| 2011/0264491 A1* | 10/2011 | Birnbaum | ............... | G06F 9/451 |
| | | | | 705/14.4 |
| 2013/0217333 A1* | 8/2013 | Sprigg | .................... | H04W 4/80 |
| | | | | 455/41.2 |
| 2014/0180817 A1* | 6/2014 | Zilkha | ................ | G06Q 30/0239 |
| | | | | 705/14.55 |
| 2014/0315614 A1* | 10/2014 | Granich | ................ | G07F 17/329 |
| | | | | 463/17 |
| 2015/0100398 A1* | 4/2015 | Narayanaswami | ......................... | |
| | | | | G06Q 30/0236 |
| | | | | 705/14.16 |
| 2015/0213496 A1 | 7/2015 | McDevitt et al. | | |
| 2021/0174394 A1 | 6/2021 | McDevitt et al. | | |

OTHER PUBLICATIONS

Spiekermann, S., Rothensee, M. and Klafft, M., 2011. Street marketing: how proximity and context drive coupon redemption. Journal of Consumer Marketing. DOI: 10.1108/07363761111143178 . arXiv:2005.06839 (Year: 2011).*

Babakus, E., Tat, P. and Cunningham, W. (1988), "Coupon Redemption: a Motivational Perspective", Journal of Consumer Marketing, vol. 5 No. 2, pp. 37-43. https://doi.org/10.1108/eb008224 (Year: 1988).*

* cited by examiner

SYSTEMS AND METHODS FOR DYNAMICALLY DETERMINING PROMOTIONS ASSOCIATED WITH DIGITAL COUPONS

TECHNICAL FIELD

The present disclosure relates generally to digital coupons and, more particularly, to dynamically determining or modifying promotions associated with digital coupons based on a variety of factors.

BACKGROUND

Coupons are standard marketing and advertising tools used to promote new products or the purchase of more products (e.g., buy two, get the second for half price). Coupons are also typically employed to increase periodic sales or consumer traffic. Coupons are often used to drive traffic to "brick and mortar" stores. The assumption is that consumers who take advantage of the coupon will also purchase full-price items during the same trip. (The discounted coupon items act as a "loss-leader"). Some coupons are used to smooth or predict demand. Such coupons typically work on a single day (e.g., a "Door-Buster Coupon Valid this Saturday Only!") and may be sent to select customers for "early-bird" preview sales events.

Traditionally, coupons were limited to printed mediums. Recent advancements in electronic technology, ranging from personal computers to smart phones, now allow for digital coupons. Digital coupons may be delivered to consumers by a variety of means including e-mail, client applications, or even printed coupons that include a machine-readable bar code or QR code (some client applications allow consumers to take a digital photograph of a coupon, save it, share it, and use it at retailers with digital scanners).

Conventional solutions related to coupons all require the promotion associated with the coupon to be determined before the coupon is sent, as well as before the consumer visits a location in order to redeem the coupon.

SUMMARY OF THE DISCLOSURE

Embodiments disclose systems and methods for dynamically determining promotions associated with digital coupons based on a variety of factors.

In certain embodiments, methods are disclosed for delivering electronic coupons with dynamically determined promotions by providing a coupon with an undetermined promotion. It is determined whether the current geographic location of a mobile device associated with the coupon is within a geo-fence associated with the coupon. When the current geographic location of the mobile device is determined to be within the geo-fence associated with the coupon, a promotion is determined and the determined promotion is sent for display at the mobile device.

According to certain embodiments, systems are disclosed for delivering electronic coupons with dynamically determined promotions. One system includes a memory having processor-readable instructions stored therein and a processor configured to access the memory and execute the processor-readable instructions, which when executed by the processor configures the processor to perform a plurality of functions, including functions to: provide a coupon with an undetermined promotion; determine whether the current geographic location of a mobile device associated with the coupon is within a geo-fence associated with the coupon; determine the promotion and send the determined promotion to the mobile device.

According to certain embodiments, a computer readable medium is disclosed as storing instructions that, when executed by a computer, cause the computer to perform functions to: provide a coupon with an undetermined promotion; determine whether the current geographic location of a mobile device associated with the coupon is within a geo-fence associated with the coupon; determine the promotion and send the coupon with a determined promotion for display at the mobile device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
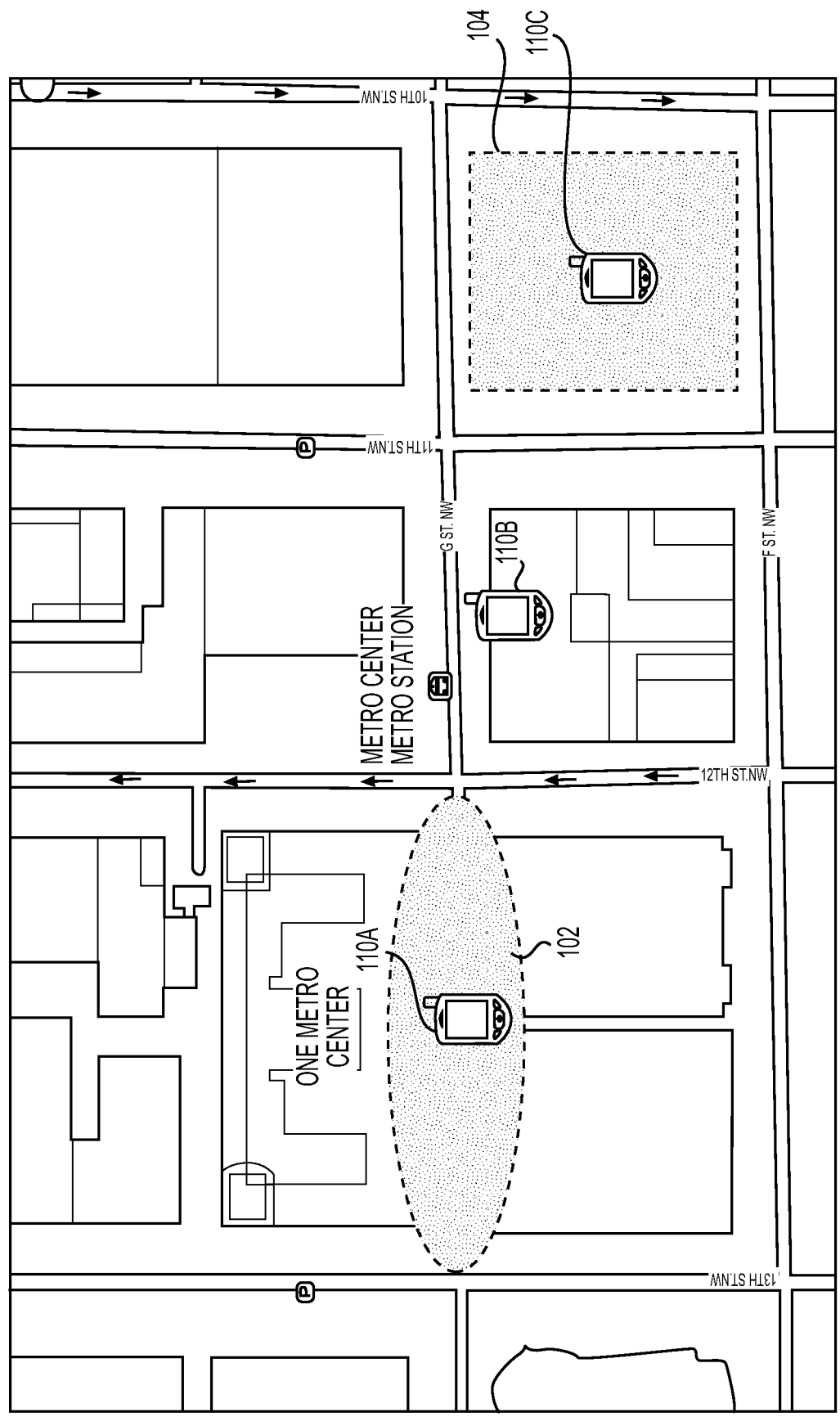
FIG. 1 is a view of a map showing multiple geo-fenced areas associated with a coupon.

Coupons can be used to entice consumers to go to a commercial establishment and spend money. The promotions associated with these coupons are usually decided before the coupon is even sent to the consumer. These promotions are thereby also determined before the consumer arrives at the commercial establish to redeem the coupon. However, by sending coupons with preset promotions, advertisers risk providing, in advance, coupons with too high or too low a value to produce the desired sales results. If the promotion is too small, the coupon will not have the desired effect, whether that be getting consumers to the store, or a certain profit driven by the coupon. However, if the promotion is too high, the consumers may have still come to the store or participated in the promotion if the advertiser would have given away less, hence the advertiser is giving away more than was necessary to produce the desired results. Conventional solutions do not provide ways to smooth demand or maximize the profit by dynamically determining the promotion, much less make such a determination based on real-time sales data, the consumer's location, and/or the time-of-day.

The present disclosure is directed to overcoming one or more of the above referenced issues. Specifically, the present disclosure is directed to dynamically determining a promotion associated with digital coupons based on a variety of factors in order to maximize the advertiser's profits.

A digital coupon may be delivered to the consumer in a variety of ways. For example, a coupon may be printed and delivered via mail, newspaper, magazine, etc. In some embodiments, the printed material may can include, for example, a machine-readable bar code or QR code. Then, using a mobile device and a client application, a consumer may take a digital photograph of a coupon, save it, share it, and use it at retailers with digital scanners. In other embodiments, the printed material may contain an address to a website and prompt the consumer to visit that website to obtain and download the coupon. Alternatively, the coupon can be electronically delivered to the consumer. For example, an advertiser can deliver interactive coupons to the consumer's desktop, enable SMS delivery of the coupons to mobile devices, and track the "desktop-to-mobile" redemption ratio. An advertiser can also send a link to the coupon via e-mail, in-app push notification, banner advertisement presented on a website, client application's graphical user interface, or other any other ways of electronically delivering content to a consumer.

In the present application, once a consumer receives the coupon, the exact promotion associated with that coupon is undetermined by the advertiser and unknown to the consumer. For example, the coupon will prompt the consumer to go to a location associated with the coupon, by explaining that the promotion will only be revealed at such a location. For instance, the coupon may say "Visit your favorite [company name] location to reveal the promotion." Locations associated with coupons may be, among other things, any commercial establishment, including, but not limited to, restaurants, stores, and event venues. The coupon may provide a link to a website listing all the locations associated with the coupons so the consumer can determine the location he or she wishes to visit. The coupon may also provide a list of the locations closest to the current location of the consumer or, if such information is known, a location associated with the consumer, such as a mailing or billing address, a location the mobile device frequents, or a location the mobile device spends above a threshold amount of time. In addition to the modification of the promotion itself, having a promotion that is unknown to the consumer at the time of receipt may also help to increase profit. Specifically, upon receiving a coupon, the user may not always go to the location in which the coupon is redeemable. However, by not revealing the promotion associated with the coupon, the mystery involved may also entice the consumer to go to the location thereby helping to promote the sale and further increase profit.

At the time the coupon is delivered to the consumer, the advertiser may have some guidelines for the promotion. For example, the advertisers may know whether the promotion will be a discount, a deal, a rebate, or some other promotion. The advertiser may also know a range for the discount, for example, the advertiser may have already determined that each coupon will only provide a discount between 10% and 50%, that the coupon will be "buy one get the second between 50% and 100% off," or that, if the consumer spends between $100 and $500, the consumer can receive a free gift. If such options are known to the advertiser at the time the coupon is delivered to the consumer, some or all of this information may be provided with the coupon so as to further entice the consumer to go to the location associated with the coupon. For example, the coupon could read "Discounts available up to 50%. Go to a [company name]'s to find out how much you've won."

In some embodiments, the advertiser can designate certain locations as being associated with the coupon. For example, if the coupon is for a chain store, all store locations worldwide can be associated with the coupon or just those the advertiser decides to have participate in the promotion. The advertiser can also designate times when the location will be associated with the coupon. For example, the advertiser may not want the sale to start until after Christmas, or may be trying to drive up sales on weekdays or during typical nine to five working hours.

In certain embodiments, a geographic location associated with the coupon may be, for example, a predetermined geographic area of any size and shape, e.g., as determined by the advertiser. The bounds of the geographic area may be defined by, for example, a customized geo-fence or virtual perimeter surrounding the physical store, a certain radius around the store, the entire shopping center the store is located within, and/or the store's parking lot. It should be noted that a location associated with the coupon and its corresponding geo-fence is not limited to stores, but can be created with respect to any establishment, including, but not limited to, restaurants and event venues. As with all geo-fences, these may be an invisible, virtual perimeter, the extent of which is not explicitly displayed or viewable.

As discussed above, the coupon will not be activated and the promotion will not be determined until the current location of the consumer's mobile device is within a geo-fence associated with the coupon. The coupon can be activated in a variety of ways. First, the advertiser can automatically request updated location information from the consumer's mobile device. If the current location of the mobile device is determined to be within a geo-fence associated with the coupon, then, without consumer action, the promotion may be determined and an activated coupon containing the determined promotion may be delivered to the consumer. This delivery may be done by push-notifications, text message, e-mail, or other means.

Alternatively, an action by the consumer may be required to activate the coupon. Such "activating actions" may include, but are not limited to, opening a client application associated with the coupon, interacting in any way with the coupon, playing a game, watching a video, downloading a client application, digital "scratching" a digital scratch off area of the screen, taking a survey, or posting on a social media site. Once the consumer performs the required activating action, the advertiser may then request the current geographic location of the mobile device. If the geographic location of the mobile device is within a geo-fence associated with the coupon, the promotion can be determined and then delivered to the mobile device. As with the above example, the consumer can gain access to the activated coupon containing the determined promotion by push-notifications, text message, e-mail, or other methods. If the consumer's mobile device was displaying an image associated with the coupon, the screen may change to reveal an image containing the determined promotion. For example, with respect to the digital scratch off, a consumer may slide his or her finger over a designated area of the screen, and the display screen may appear as if the "top layer" of the designated area was being removed with each slide, revealing the promotion underneath.

In some circumstances, the advertiser may not have access to the consumer's current location. In these situations, the advertiser can request access to the user's location at any time including, but not limited to, when a coupon is downloaded or installed, or when the user attempts to perform an activating action, as described above. For example, if the user attempts to activate the coupon, and the advertiser cannot determine if the mobile device is within a geo-fence associated with the coupon, a message may be sent to the consumer prompting them to allow the advertiser access to its current location.

If the consumer attempts to activate a coupon, and it is determined that the current location of the mobile device is not within a geo-fence associated with the coupon, a message can be sent prompting the consumer to visit a specified location. This message can also include a link to all participating locations. The message can also include the address of and directions to the participating location(s) closest to the current location of the mobile device or participating location(s) closest to an address associated with the consumer (e.g., mailing and billing address).

If, by continuously requesting an update of the current location of the mobile device or after an activating action is performed, it is determined that the current location of the mobile device is within a geo-fence associated with coupon, the promotion can then be determined. The promotion can be determined by any way the advertiser deems appropriate. For example, an initial promotion may be designated by the advertiser or selected at random. From this initial promotion, the value of the promotion may be increased or decreased to set values, by set values, by incremental steps, by exponential amounts, or any other way the advertiser decides. For example, the advertiser could set an initial promotion of 35% off at the beginning of the sale. If the advertiser determines that the promotion is too large, the advertiser may decrease the promotion to a preset discount of 20% off. In another example, the advertiser could have a set first promotion, but then have the remainder of the promotions based off the most recent promotion given or most recent promotion redeemed. Hence, if the most recent coupon activated had a promotion for a $50 rebate, and it is determined that the promotion should be greater, the next promotion could be raised by $5 increments or exponentially until the advertiser determines that the promotion is producing the desired sales results. As described in more detail below, the factors and formulas that can be used to determine the promotion associated with the coupon are limitless and can be set and weighed in any way the advertiser desires. A few examples of such factors that can be considered in making such determinations are the time of day, day of the week, period of the year, historic consumer traffic or sales data, real-time data per a certain amount of time for profits, real-time data for the number of coupons redeemed, real-time data for total promotions redeemed, and real-time data for profits. (In addition, promotions can also be adjusted based on redemption statistics, as will be explained in further detail below.)

In some embodiments, factors may be measured on any basis, including, but not limited to, per store, geographic region (e.g., Ohio, Midwest, United States, North America, etc.), department (e.g., men's wear versus shoes), division (e.g., Ann Taylor versus Ann Taylor Loft), or chain wide. In one simplified example, a store in downtown Washington, D.C. has redeemed a large number of coupons, while a store in Cleveland has redeemed no coupons. In this scenario, consumers at the store in Washington, D.C. could receive coupons for 10% off, while customers at the other location in Cleveland could receive coupons for 20% off. If too many customers take advantage of the 20% off coupon in Cleveland, the advertiser could later decrease the promotion, if necessary. If the advertiser determines that the number of coupons redeemed in the next hour at the Washington, D.C. location is now below a threshold, the advertiser can increase the promotion available in that store. This allows the advertiser to use real-time data to dynamically determine the best discount rate by location or by time of day, and thus, maximize profits from the sale. These factors may relate to the specific mobile device associated with the coupon or consumer as well. For example, if the consumer is a heavy user, (i.e. redeeming a greater number of coupons than a threshold) it may be assumed this user will redeem the coupon regardless of promotion and smaller promotion may be sent. In another example, if no coupon less than 45% off has ever been redeemed from the mobile device, a promotion greater 45% off may be needed to entice the user of the mobile device to redeem the coupon. All of the above listed factors and bases can be used alone or in combination with each other and/or others not listed to dynamically determine the promotion. Each factor used to dynamically determine the promotion can be given equal or varying weights.

Advertisers can also provide the consumer with an opportunity to increase the promotion. The promotion itself or an increase in the initially provided promotion can be determine based on a "boosting" action taken by the user of the mobile device. This provides the advertiser with the ability to dynamically change the value of the digital coupon in a way that is perceived as fair and thus attractive to consumers. This may increase the consumer's willingness to use the coupon, if the consumer believes he or she has control over the given promotion.

This boosting action may have direct benefits for the advertiser. For example, the action could be watching a video related to the advertiser and/or what the advertiser is selling, taking a survey, downloading a client application associated with the advertiser, liking or following the advertiser on a social media site, or posting about the advertiser on a social media site. The boosting action could also be a button that just automatically boosts/increases the promotion before or after it has been presented to the consumer or a game in which achieving a certain level or gaining enough points corresponds with different promotions. For example, the advertiser could deliver the consumer with a promotion of buy one get one half off, but, if the user also watches a video about the restaurant's new dishes, the promotion can increase to buy one get one free. In another example, the advertiser has not yet displayed the determined promotion to the consumer, but prompts the consumer to play a game in which, for every 500 points that the consumer can obtain, the advertiser will add an addition 5% off of the previously determined (but not yet revealed) promotion.

The redemption statistic of the delivered coupons can also be tracked. If the delivered coupon is redeemed, the redemption statistics (e.g., a success rate) may be updated (e.g., increased or incremented by some predetermined value). If a delivered coupon has not been redeemed, for example, in a predetermined amount of time and/or the current location of the consumer's mobile device is no longer in the geo-fence associated with the coupon, the failure rate may be updated. The promotion associated with the redeemed (successful) and unredeemed (failed) coupons can also be stored. These redemption statistics may be used by the advertiser in a number of ways to determine future promotions. In a simplified example, the advertiser could extrapolate that the average value of the unredeemed coupons is not sufficient to drive sales, and that future promotions should be higher than that average. In another example, if the success rate is above a threshold, all promotions may be decreased or only promotions below the average promotion of the redeemed coupons may be awarded.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a view of a map 100 showing a plurality of geo-fenced areas associated with coupons. As shown in FIG. 1, map 100 includes a geo-fenced area 102 and a geo-fenced area 104. These geo-fenced areas 102 and 104 may be in existence for any amount of time suitable for the advertiser's needs. The geo-fenced areas may, for example, be permanent. Alternatively, the geo-fenced areas may be temporary (e.g. in existence for a limited period of time, or only certain hours of the day).

In one example, the area may be outside of a business that has one or more promotions available for a consumer to activate. In another example, the area may be a restaurant that desires to increase, e.g., lunch traffic on weekdays. This area might not involve a geo-fence activating coupons at all times, but rather, only from the hours of, e.g., 11 am until 2 pm, Monday through Friday.

The boundaries or dimensions of each of the geo-fenced areas 102 and 104 may correspond to, for example, the shape and size of a building or other physical structure associated with the coupon (e.g., a restaurant, store, concert venue, or any other businesses likely to provide coupons). The size and shape of each geo-fenced area may be any combination of the surface area of the business itself, a predetermined radius around the business, a shopping center the business is located in, or the business's parking lot.

Also, as shown in FIG. 1, map 100 indicates the geographic locations of a mobile device 110a, a mobile device 110b, and a mobile device 110c. Each of mobile devices 110a, 110b, and 110c may be implemented using, for example, any type of mobile computing device including, but not limited to, a laptop computer, tablet computer, mobile handset, smartphone, personal digital assistant (PDA), a dedicated portable Global Positioning System (GPS) navigation device, or similar type of mobile device. Further, each of mobile devices 110a, 110b, and 110c may be equipped with a GPS receiver or equivalent for registering GPS location data, e.g., latitude and longitude coordinates, at a particular point or over a period of time. However, it should be noted that the physical or geographic location of each of mobile devices 110a, 110b, and 110c may be determined or estimated using any one or a combination of various well-known techniques for deriving such geographic location information. Examples of such techniques include, but are not limited to, GPS, cell identification (e.g., using Cell ID), cellular tower triangulation, multilateration, Wi-Fi, and any other network or handset based technique for deriving or estimating the physical or geographic location of a mobile device via a mobile communication network.

Each of mobile devices 110a, 110b, and 110c may be configured to receive, display, activate, and redeem the coupon in some way, including, but not limited to, downloading the coupon, scanning the coupon from printed material, accessing an e-mail or a website containing coupon data, or executing a client application containing the coupon.

In one implementation, the coupon is delivered and displayed via a client application executable at each of mobile devices 110a, 110b, and 110c. Each of mobile devices 110a, 110b, and 110c may be configured to receive a message notification for a user at each device at which the coupon has been activated or that they are within a geo-fence associated with the coupon (e.g., geo-fences 102 and 104) and the coupon is now available for activation. Such notifications may be sent to each of mobile devices 110a, 110b, and 110c by an advertiser server via a mobile communications network. The notifications received at mobile devices 110a, 110b, and 110c may be displayed in a general notifications window of a GUI provided by the operating system of mobile devices 110a, 110b, and 110c. However, it should be noted that the techniques disclosed herein are not limited to push notifications and that these techniques may be applied with any type of messaging scheme or protocol used to deliver coupons to mobile devices 110a, 110b, and 110c. It should also be noted that the above implementation incorporating client applications and message notifications is only exemplary and any means can be used to display and deliver the coupon. In other implementations, the original coupon containing an undetermined promotion could be displayed on the mobile device as a scanned picture, part of an email, a text message, and/or a website. After the coupon is activated and the promotion is determined, the promotion can be delivered to the consumer, for example, by email, text message, as a pop up webpage, or as a link to a new webpage.

In some implementations, mobile device 110a, 110b, or 110c may be configured to periodically report its current geographic location to an advertiser, coupon, or promotion determination server as this location changes over a period of time. Mobile device 110a, 110b, or 110c may also be configured to report its current geographic location to the advertiser, coupon, or promotion determination server if the consumer attempts to activate the coupon. As will be described in further detail below, upon receiving an indication of a new or updated current geographic location of mobile device 110a, 110b, or 110c, the coupon server may query the advertiser server to determine whether the updated geographic location is within a geo-fence associated with the coupon. This determination may be made based on stored information identifying the locations and boundaries of various areas associated with the coupon.

If it is determined that the geographic location of mobile device 110a, 110b, or 110c is within a geo-fenced area associated with the coupon, e.g., within geo-fenced area 102 or geo-fenced area 104, the coupon server may provide the promotion determination server with the current geographic location of the mobile device and may query the promotion determination server to determine the promotion for mobile device 110a, 110b, or 110c. The promotion determination server may then send a promotion to the coupon server and the coupon server may then send a message containing the promotion to mobile device 110a, 110b, or 110c.

As indicated by map 100, the current geographic location of mobile device 110b in this example may not be within a geo-fence associated with the coupon, e.g., corresponding to either of geo-fenced areas 102 or 104. Thus, upon determining that mobile device 110b is not currently located within a geo-fence associated with the coupon, the above-described advertising server provided by the advertiser may send a message prompting the user to visit a location associated with the coupon. The advertiser may also determine which geo-fence associated with the coupon (e.g., geo-fenced areas 102 or 104) is closest to the current location of mobile device 110b and send the user directions to the closer of geo-fence-areas 102 or 104 from the current location of mobile device 110b. In another example, the advertiser server may use stored information about the user (e.g. the user's mailing or billing address) to determine the closest geo-fence associated with the coupon, and prompt the user to visit and/or provide user with directions to that geo-fence associated with the coupon.

Figure 2:
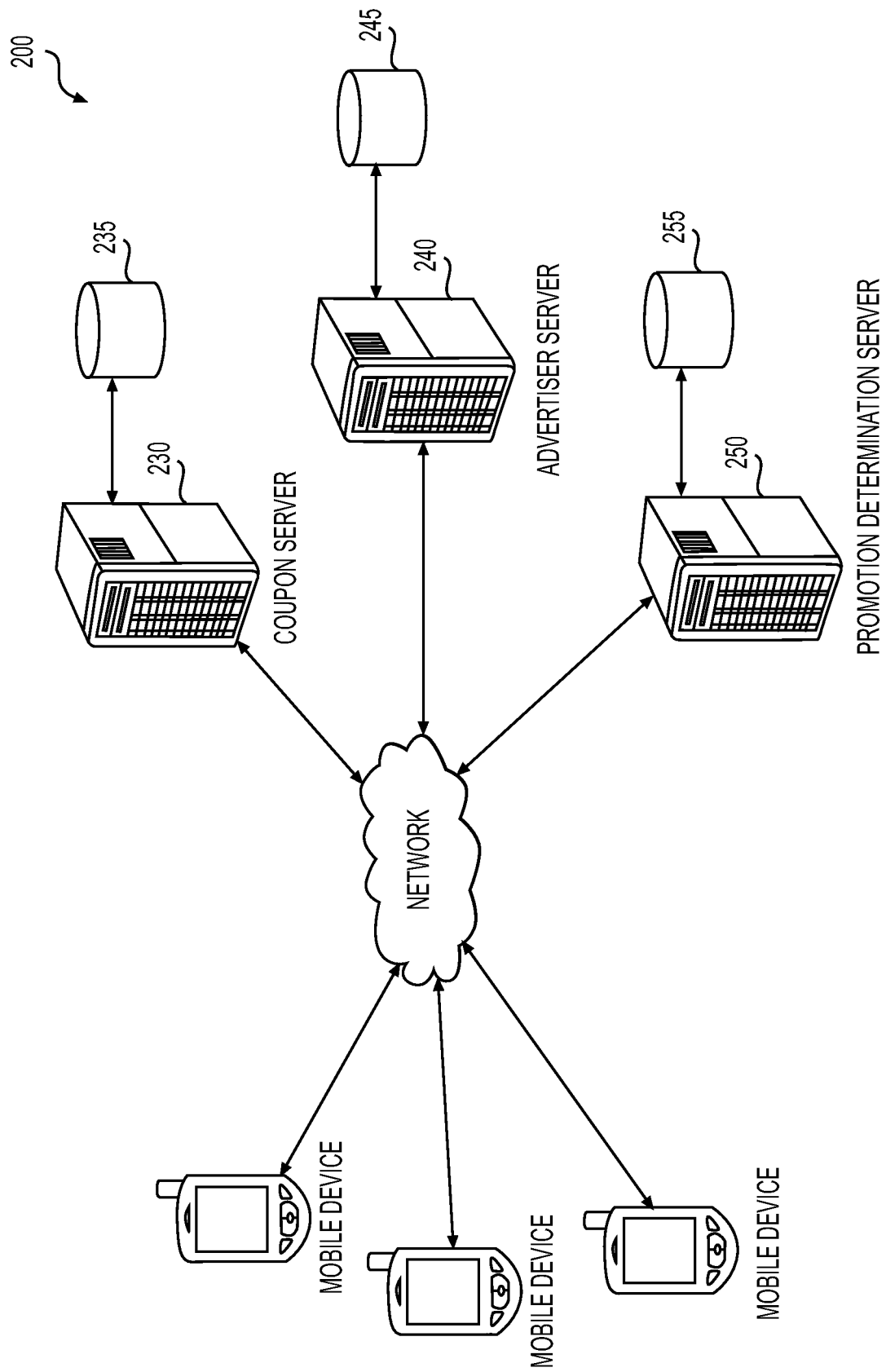
FIG. 2 is a block diagram of an exemplary communication system suitable for practicing an embodiment of the present disclosure.

FIG. 2 is a block diagram of an exemplary communication system 200 for practicing embodiments of the present disclosure. As shown in FIG. 2, system 200 includes mobile devices 210a, 210b, and 210c, a coupon server 230 coupled to a database 235, an advertiser server 240 coupled to a database 245, and a promotion determination server 250 coupled to a database 255, all of which may be communicatively coupled via an electronic communication network 220.

Network 220 may be any type of electronic network or combination of networks used for communicating digital content and data between various computing devices. Network 220 may include, for example, a local area network, a medium area network, or a wide area network, such as the Internet. While only mobile devices 210a, 210b, and 210c are shown in FIG. 2, system 200 may include any number of mobile devices. Similarly, while only a coupon server 230, an advertiser server 240, and a promotion determination server 250 are shown in FIG. 2, it should be understood that system 200 may include additional or fewer servers, as desired for a particular implementation. Further, while not shown in FIG. 2, network 220 may include various switches, routers, gateways, or other types of network devices used to facilitate communication between various computing devices via network 220.

In the example shown in FIG. 2, mobile device 210a may be a laptop, notebook, netbook, or similar type of mobile computing device. Mobile device 210b may be, for example, a tablet device or similar type of mobile device having a touchscreen display. Mobile device 210c may be, for example, a mobile handset, smartphone, or personal digital assistant ("PDA"). However, it should be noted that each of mobile devices 210a, 210b, and 210c may be any type of mobile computing device configured to send and receive different types of data including, but not limited to, website data, multimedia content, electronic advertisements, and any other type of digital information, over network 220. Examples of such mobile computing devices include, but are not limited to, a laptop computer, a handheld computer, a personal digital assistant (PDA), a cellular telephone, a network appliance, a camera, a smart phone, an enhanced general packet radio service (EGPRS) mobile phone, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen, microphone, camera, keyboard, and/or mouse.

Each of coupon server 230, advertiser server 240, and promotion determination server 250 may be any of various types of servers including, but not limited to, a web server, a proxy server, a network server, or other type of server configured to exchange electronic information with other servers or computing devices via a communication network, e.g., network 220. Such a server may be implemented using any general-purpose computer capable of serving data to other computing devices including, but not limited to, mobile devices 210a, 210b, and 210c or any other computing device (not shown) via network 220. Such a server may include, for example and without limitation, a processor and memory for executing and storing processor-readable instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory and graphical user interface display. The server may also be implemented using multiple processors and multiple shared or separate memory devices within, for example, a clustered computing environment or server farm.

Also, as shown in FIG. 2, coupon server 230, advertiser server 240, and promotion determination server 250 are communicatively coupled to databases 235, 245, and 255, respectively. Each of databases 235, 245, and 255 may be a data store or memory accessible to the corresponding server and may be implemented using any type of data storage device or recording medium used to store various kinds of data or content. Such data or content may include, for example and without limitation, text or media content that may be later provided to each of mobile devices 210a, 210b, and 210c via network 220.

In an example in which the coupon is delivered and displayed via a client application, the coupon and the determined promotion are stored and delivered to the user via the GUI of a client application. It should be noted that this is just an example, and that the coupon and determined promotion in part or in whole can be stored and/or delivered on any electronic medium, including, but not limited to, on the hardware of the mobile device, internet sites, or by e-mail. Each of mobile devices 210a, 210b, and 210c may execute a client application that communicates with the coupon server 230, advertiser server 240, and/or promotion determination server 250 via network 220. Further, each of mobile devices 210a, 210b and 210c may be configured to receive coupon and advertisement content through an interface provided by advertiser server 240 via network 220.

Coupon server 230 may be configured to host a web service that provides users various types of functionality via a GUI of the client application or webpage executable at each of mobile devices 210a, 210b and 210c. Such functionality may include, for example and without limitation, providing digital coupons and determined promotions distributed by an advertiser or other coupon provider. As described above, the coupons sent to each device may be displayed for the user via a message notifications interface of a mobile operating system at each of mobile devices 210a, 210b, and 210c, in the GUI of a client application, on a webpage, or a text message.

Further, coupon server 230 and advertiser server 240 may be configured to communicate with promotion determination server 250 or one or more other third-party content servers (not shown) to retrieve coupons with determined promotions via network 220 to be displayed in a number of ways to the user, including, within a content view of a client application executable at each of mobile devices 210a, 210b, and 210c. Further, coupon server 230, advertiser server 240, and promotion determination server 250 may each interact with one another, mobile devices 210a, 210b, or 210c, or any other servers or network devices (not shown) via network 220. Examples of such other servers include, but are not limited to, DNS servers, ad servers, and content distribution servers.

Advertiser server 240 in this example may be configured to control the activation of the coupon and the determination of the promotion until the current location of each of mobile devices 210a, 210b, and 210c is within a geo-fence associated with the coupon, e.g., geo-fenced areas 102 and 104, as described above. Coupon server 230 may be configured query the advertiser server 240 via network 220, to determine the current location of each of mobile devices 210a, 210b, and 210c is within a geo-fence associated with the coupon. Promotion determination server 250 may be configured to receive a request for a promotion including the current geographic location of mobile device 210a, 210b, or 210c from coupon server 230 or advertiser server 240 and determine and send the appropriate promotion to each of mobile devices 210a, 210b, and 210c or to either coupon server 230 or advertiser server.

In some implementations, advertiser server 240 or promotion determination server 250 may be implemented as a back-end components that interface with only other servers. Thus, it should be noted that for some implementations, advertiser server 240 may be configured to act as an intermediary between coupon server 230 and promotion determination server 250, without any direct communication with any of mobile devices 210a, 210b, or 210c, in order to facilitate the promotion determinations described herein. Accordingly, coupon server 230, advertiser server 240, and promotion determination server 250 may be configured to exchange information in the form of messages, requests, or responses that are passed between the servers. The communication between coupon server 230, advertiser server 240, and promotion determination server 250 may be over network 220 or a virtual private network accessible to each server. It should be noted that the functions performed by coupon server 230, advertiser server 240, and promotion determination server 250, or any combination thereof, as described herein, may be implemented using a single server. Additional features and characteristics of the communication between mobile devices 210a, 210b, and 210c, coupon server 230, advertiser server 240, and promotion determination server 250 will be described in further detail below with respect to FIG. 3.

Figure 3:
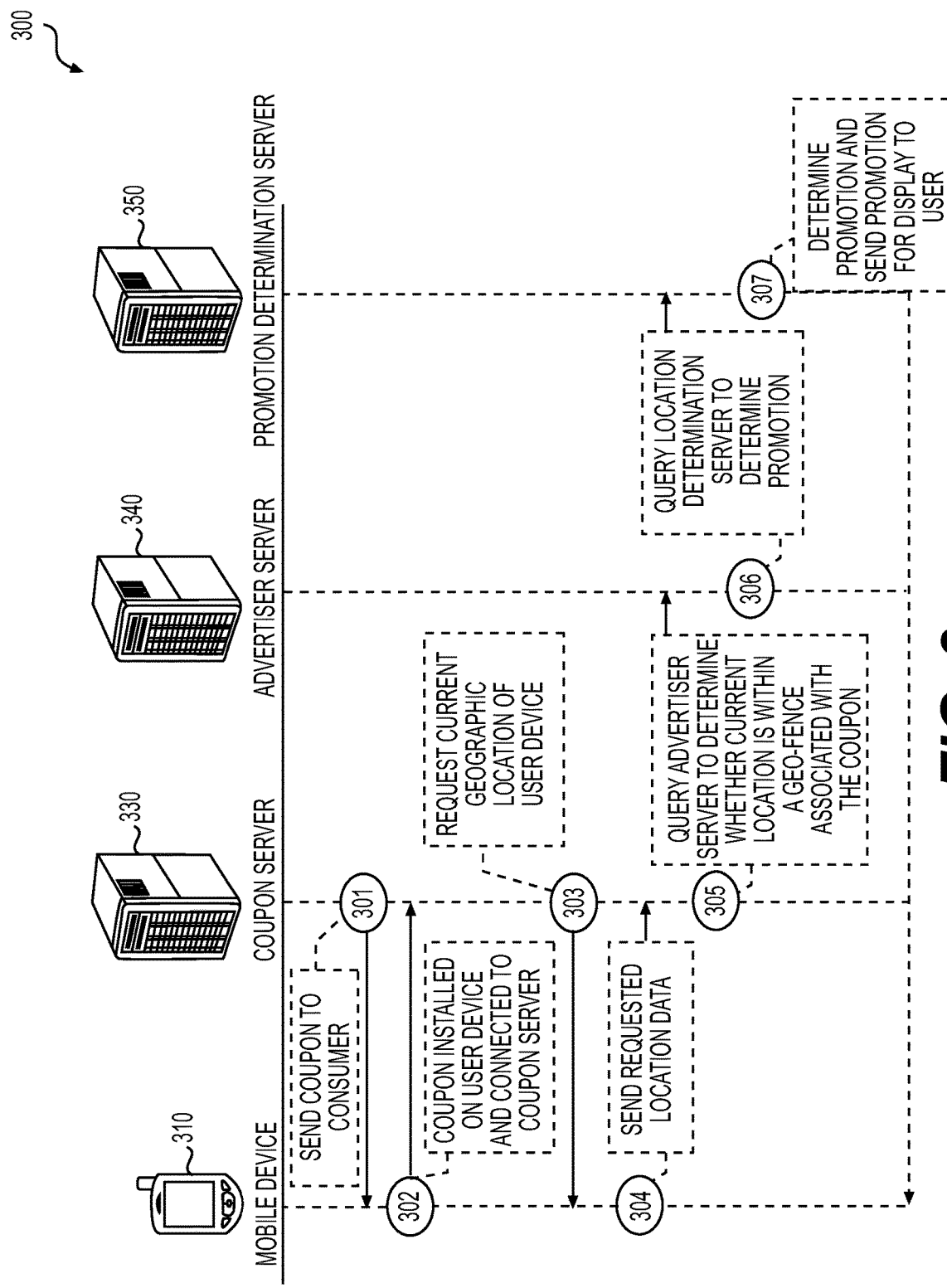
FIG. 3 is a communication flow diagram of an exemplary process for delivering dynamically determined promotions associated with digital coupons to a mobile device.

FIG. 3 is a communication flow diagram of an exemplary process 300 for maximizing profits by dynamically determining a promotion, as described above. The example shown in FIG. 3 illustrates the communication flow between a mobile device 310, a coupon server 330, an advertiser server 340, and a promotion determination server 350. For purposes of discussion, process 300 will be described using map 100 of FIG. 1 and system 200 of FIG. 2, as described above, but process 300 is not intended to be limited thereto. Thus, mobile device 310 may be implemented using, for example, any of mobile devices 210a, 210b, or 210c of FIG. 2, as described above. Similarly, coupon server 330, advertiser server 340, and promotion determination server 350 may be implemented using, for example, coupon server 230, advertiser server 240, and promotion determination server 250, respectively, as described above.

As shown in FIG. 3, coupon server 330 may send a coupon to the consumer. The coupon can be delivered in a variety of ways including, but not limited to, the coupon server 330 directing coupons to be printed and mailed to consumers, an e-mail, a link on a webpage, and/or a message notification from a client application (e.g., a client application specifically designed for coupons) executable at mobile device 310 via a communication network, e.g., network 220 of FIG. 2, as described above (step 301). Once the consumer has loaded or accessed the coupon from mobile device 310 (thus, associated the mobile device 310 with the coupon), the mobile device can connect to the coupon server 330 (step 302). At this point, the coupon server may request access to the geographic location of mobile device 310 via a message notification or pop-up. When the coupon server 330 has access to the current geographic location of the mobile device, coupon server 330 may then (continuously or after the user attempts to activate the coupon) request a current geographic location of mobile device 310 (step 303). The request may also be sent by advertiser server 340 directly to mobile device 310, or alternatively, advertiser server 340 may send the request to coupon server 330, which may then request the geographic location information from mobile device 310, if necessary. In some implementations, coupon server 330 may respond to the request from advertiser server 340 by sending a last known or previously determined or estimated geographic location of mobile device 310, e.g., which may be stored in a memory or data store (e.g., database 235 of FIG. 2, as described above) coupled to coupon server 330. Accordingly, mobile device 310 may send the requested location data (or current geographic location information) to coupon server 330 (step 304), or to whichever server (e.g., advertiser server 340) may have requested the information from mobile device 310.

Coupon server 330 may be configured to query consumption advertiser server 340 to determine whether the current geographic location of mobile device 310 is within a geo-fence associated with the coupon, as described above (step 305). If the current geographic location of mobile device 310 is determined (e.g., by advertiser server 340) to be within a geo-fence associated with the coupon, advertiser server 340 send a message to the coupon server 330 so it may query the promotion determination server 350 or the advertiser server 340 may query the promotion determination server 350 itself to request a promotion (step 306). When coupon server 330 or advertiser server 340 queries the promotion determination server 350, coupon server 330 or advertiser server 340 may, but need not, send the current location of mobile device 310. The promotion determination server 340 may, for example, disregard this information, store it, or use is it as a factor to determine the promotion. Exemplary illustrations of the promotion determination process are described in further detail below and in FIGS. 5-7.

The results of the promotion determination may be sent in a response from promotion determination server 350 to coupon server 330 or advertiser server 340 (step 307). The determined promotion may then be sent to mobile device by the coupon server 330, advertiser server 340, or the promotion determination server 350. The determined promotion may be sent to the mobile device 310 by any means, including but not limited to, text message, pop-up window, link to a webpage, and/or message notification.

In other implementations, the determination of whether the device's location corresponds to a geo-fence associated with the coupon may be performed by coupon server 330 itself, e.g., based on information specifying one or more geographic areas associated with the coupon. Such information may be stored within a memory or data store (e.g., database 235 of FIG. 2) coupled to coupon server 330, as described above.

Figure 4:
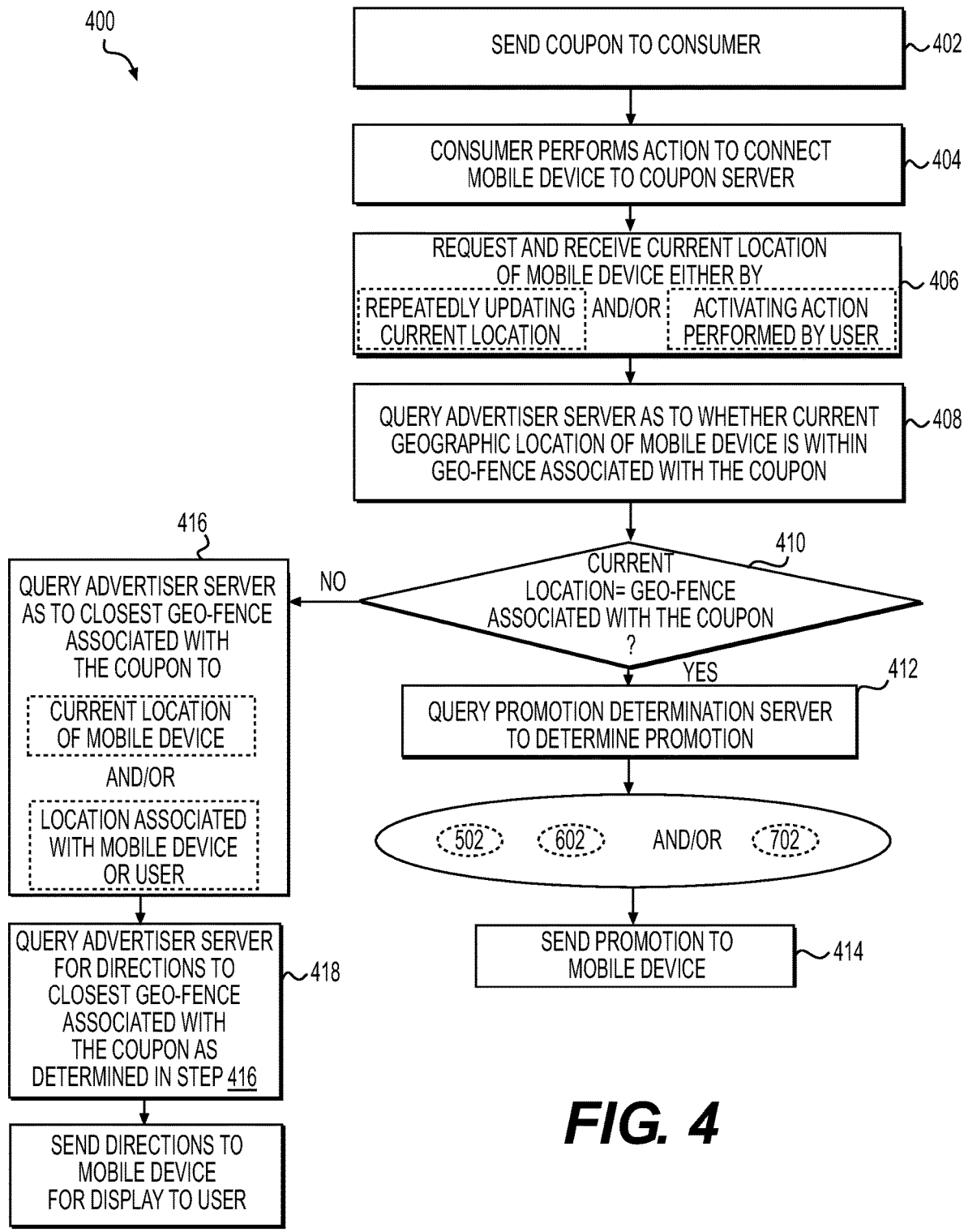
FIG. 4 is a block diagram of an exemplary processes for delivering dynamically determined promotions associated with digital coupons to the mobile device of FIG. 3

FIG. 4 is a process flow diagram of an exemplary method 400 for delivering dynamically determined promotions. For purposes of discussion, method 400 will be described using system 200 of FIG. 2 and the components of process 300 of FIG. 3 (including coupon server 330, advertiser server 340, and promotion determination server 350), as described above, but method 400 is not intended to be limited thereto. As shown in FIG. 4, method 400 includes steps 402, 404, 406, 408, 410, 412, 414, 416, 418, and 420. However, it should be noted that method 400 may include more or fewer steps as desired for a particular implementation. In an example, one or more of the above-listed steps of method 400 may be executed by advertiser server 240 of FIG. 2 or advertiser server 340 of FIG. 3, as described above. However, method 400 is not intended to be limited thereto, and the steps of method 400 may be performed by any server (e.g., coupon server 230 or promotion determination server 250 of FIG. 2 or coupon server 330 or promotion determination server of FIG. 3) or other type of computing device having at least one processor, a memory, and a network communication interface for sending and receiving information from one or more mobile devices.

Method 400 begins in step 402, which includes a coupon server (e.g., coupon server 230 of FIG. 2 or coupon server 330 of FIG. 3) sending a coupon or a teaser for a coupon with an undetermined promotion to a consumer, by mail, e-mail, webpage, text message, or any other means. In step 404, the consumer performs action which connects a mobile device (e.g., mobile device 210 of FIG. 2 or mobile device 310 of FIG. 3, as described above) to the coupon server (e.g., the consumer downloads or attempts to access the coupon on the mobile device). By completion of step 404, the mobile device may now be associated with the coupon. In step 406, the coupon server may either continuously request and receive the current geographic location of the mobile device or, after an activating action is performed by the user, a current geographic location of the mobile device may be requested and received from the mobile device. Steps 408 and 410 may include, for example, determining whether a current geographic location of the mobile device is within a geo-fenced area associated with the coupon. In some implementations, this determination may be based on a response received from querying an advertiser server (e.g., advertiser server 240 of FIG. 2 or advertiser server 340 of FIG. 3) using the geographic location information received from the mobile device. If it is determined in step 410 that the current geographic location of the mobile device is within a geo-fence associated with the coupon (step 410: Yes), method 400 may proceed to step 412, which includes querying a promotion determination server (e.g., promotion determination server 250 of FIG. 2 or advertiser server 350 of FIG. 3) to determine the promotion. The promotion may be determined in any way, including but not limited to, proceeding to step 502 of method 500 of FIG. 5, step 602 of method 600 of FIG. 6, and/or step 702 of method 700 of FIG. 7, as will be described in further detail below. Methods 500, 600, and 700, can be used either wholly or partially in combination with each other or other methods, or alone. After the promotion is determined, the promotion determination server may send the promotion directly to the mobile device for display (step 414) or to the advertiser server or coupon server for delivery to the mobile device (step 414).

However, if it is determined in step 410 that the current geographic location of the mobile device is not within a geo-fence associated with the coupon (step 410: No), method 400 may proceed to step 416, which includes querying the advertiser server to determine the closest geo-fence associated with coupon to either 1) the current location of the mobile device or 2) a location associated with the user. In an example, locations associated with the mobile device or the consumer associated with the mobile device may include a billing or mailing address of the consumer associated with the mobile device, or a location where the mobile device frequents or spends a threshold period of time. In step 418, the advertiser server may then be queried to determine directions to the geo-fences associated with the coupon determined in step 418. Method 400 then proceeds to step 420, which includes sending the directions to the mobile device for display.

Figure 5:
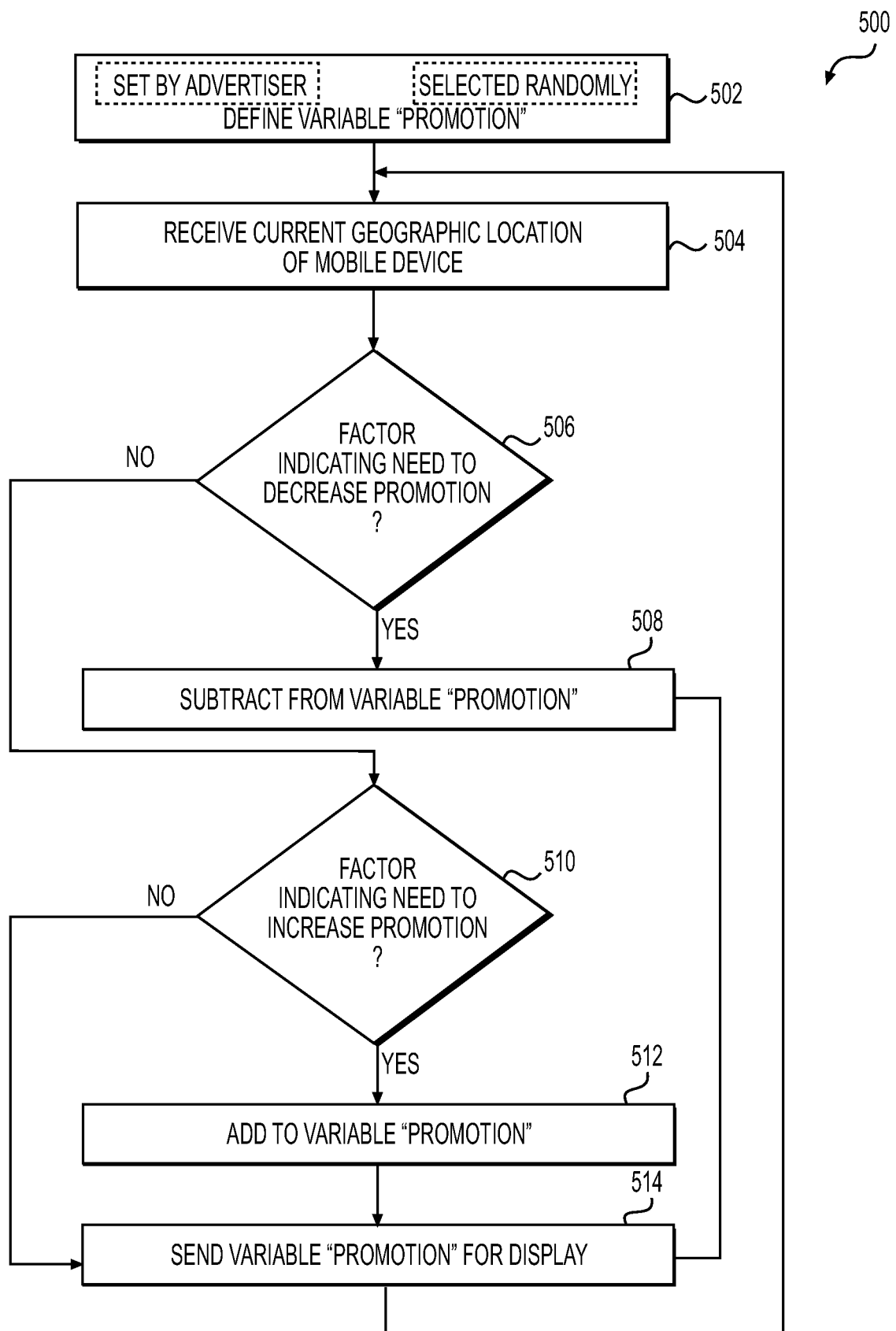
FIGS. 5, 6, and 7 are block diagrams of exemplary processes for dynamically determining a promotion associated with the digital coupon delivered in FIG. 4.
Figure 6:
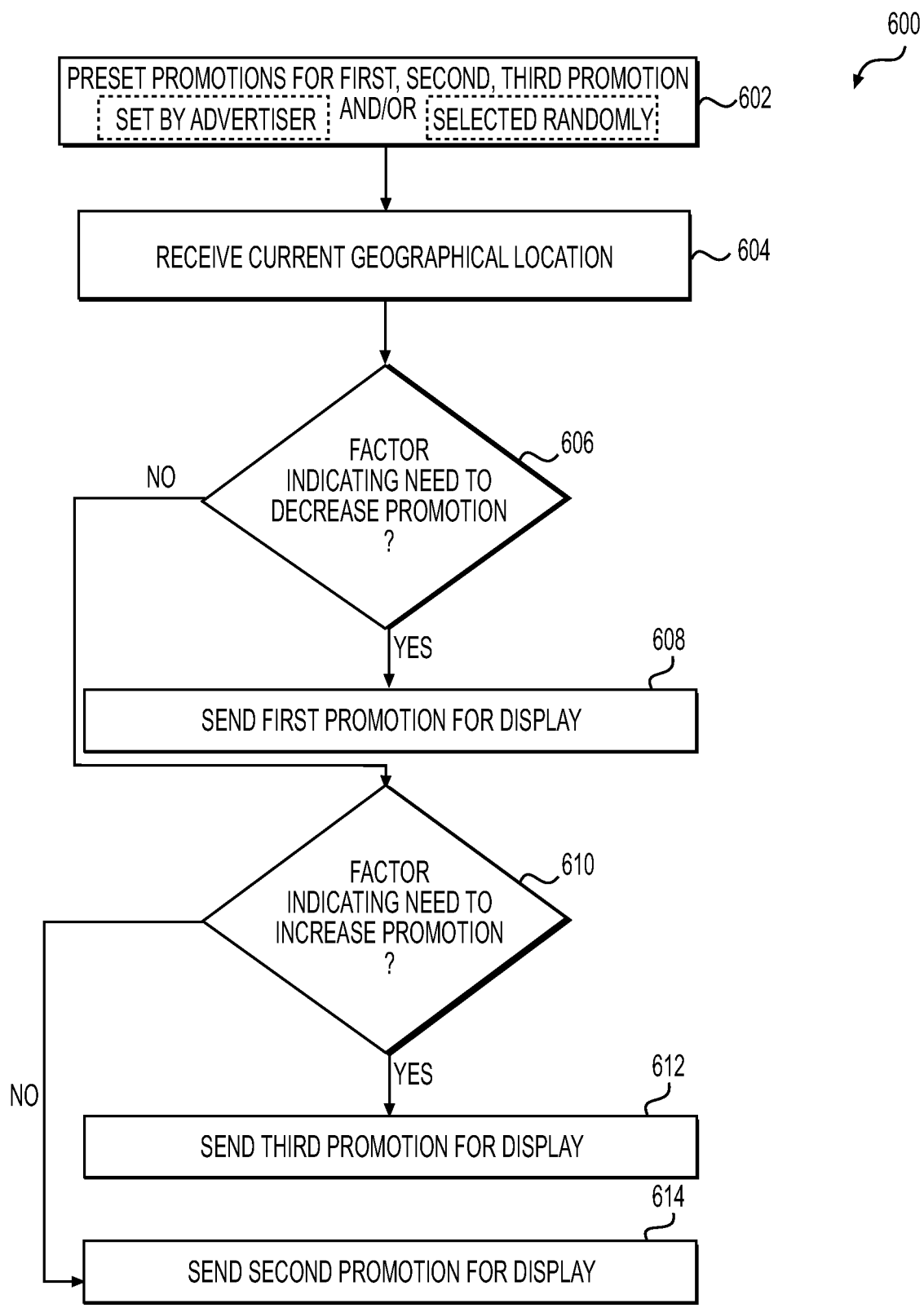
Figure 7:
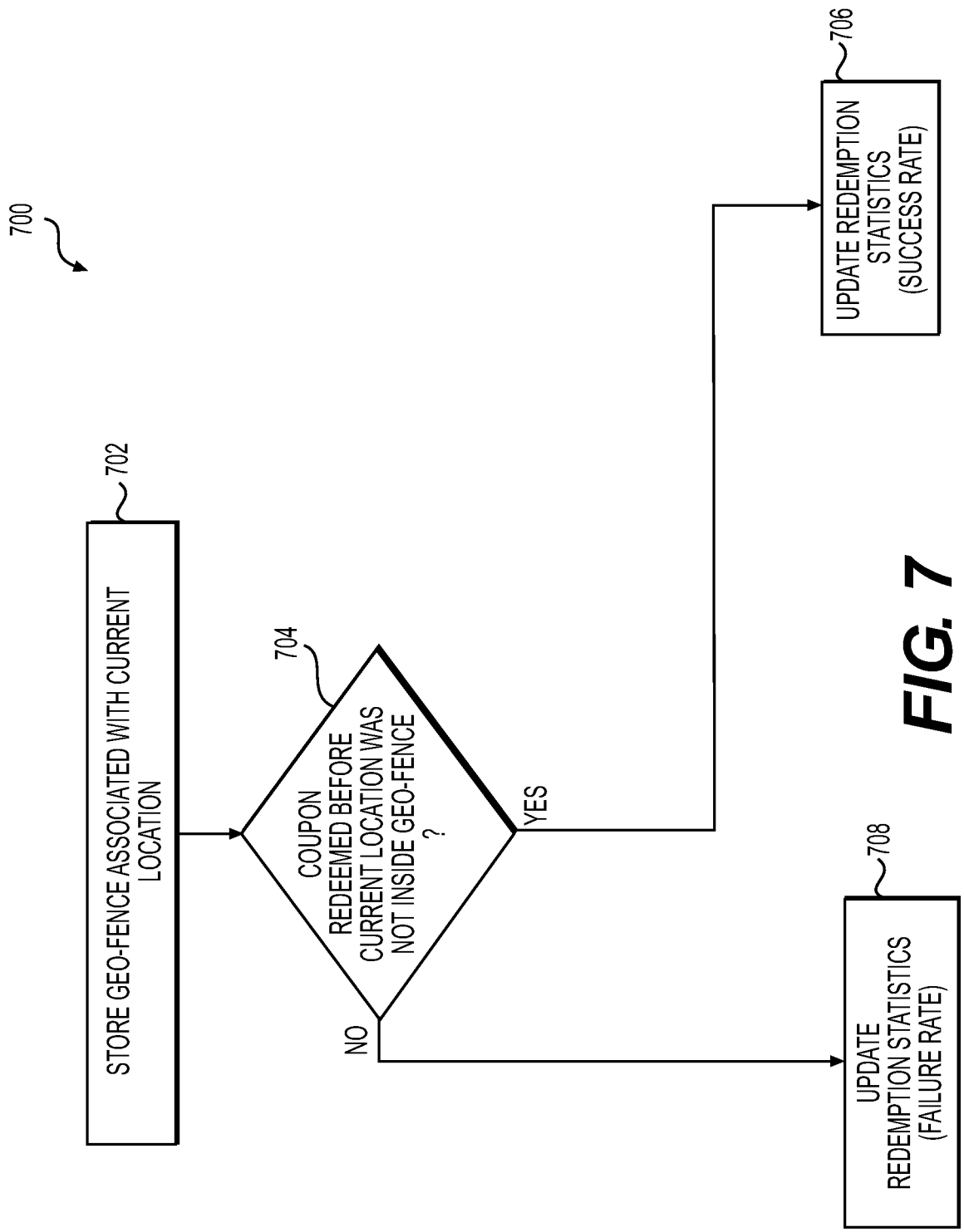

As described above, after the promotion determination server is queried, method 400 may proceed to step 502 of method 500, step 602 of method 600, step 702 of method 700, or any complete or partial combinations thereof. These methods and corresponding FIGS. 5, 6, 7 are presented for exemplary purposes only. It should be noted that the promotion can be determined by any means or formula the advertiser deems appropriate.

The promotion may be modified based on any formulas or factors. Some factors may indicate the need to decrease the promotion. This may be as simple as the advertiser deciding the promotion is too high. In more sophisticated examples, if the number of coupons redeemed is greater than a desired threshold, this may indicate that a smaller promotion would achieve the desired threshold and advertiser is "giving away" more than is necessary. Other examples of factors that indicate the need to decrease the promotion include a greater than threshold number of coupons redeemed, greater than a threshold number of coupons activated, it is currently historically determined peak hours, the location has profits historically greater than other locations, the current sales are greater than a threshold. Alternatively, some factors may indicate the need to increase the promotion. For example, the number of mobile devices in a store may be lower than a threshold, the mobile device or the consumer associated with the mobile device has never before or rarely redeems coupons, sales for the current time period have historically been low, sales are currently low, or the current location is designated as an under performer. All factors may be, but need not be, measured on any basis, including, but not limited to, per store, geographic region (e.g., Ohio, Midwest, United States, North America, etc.), department (e.g., men's wear versus shoes), division (e.g., Ann Taylor versus Ann Taylor Loft), or chain wide.

The advertiser may determine how the promotions will be adjusted. For example, the adjustment can be done at random, as an adjustment to the most recent coupon determined or the most recent coupon redeemed (method 500), or simply adjusted to a plurality of predetermined promotions (method 600).

Like method 400, method 500 will be described using system 200 of FIG. 2 and the components of processes 300 of FIG. 3, as described above, for discussion purposes only, but method 500 is not intended to be limited thereto. As shown in FIG. 5, method 500 includes steps 502, 504, 506, 508, 510, 512, and 514. However, it should be noted that method 500 may include more or fewer steps as desired for a particular implementation. In an example, one or more of the above-listed steps of method 500 may be executed by promotion determination server 250 of FIG. 2 or promotion determination server 350 of FIG. 3, as described above. However, method 500 is not intended to be limited thereto, and the steps of method 500 may be performed by any server (e.g., coupon server 230 of FIG. 2 or coupon server 330 of FIG. 3) or other type of computing device having at least one processor, a memory, and a network communication interface for sending and receiving information from one or more mobile devices. Method 500 begins in step 502, in which the variable "Promotion" is defined. The advertiser can set the variable or it can be selected at random. Method 500 then proceeds to step 504, which includes receiving the current location of the mobile device. It is first determined in step 506 whether there is a factor indicating the need to decrease the promotion, as described above. If it is determined that there is a factor indicating the need to decrease the promotion, method 500 proceeds to step 508, which subtracts from the variable "Promotion." Method 500 then proceeds to step 514, which includes sending the variable "Promotion" to the mobile device 310 for display. After step 514, method 500 then loops to step 504 with an updated variable "Promotion." If in step 506 it is determined that there is not a factor indicating the need to decrease the promotion, method 500 proceeds to step 510 to determine whether or not there is a factor indicating the need to increase the promotion, as described above. If it is determined that there is a factor indicating the need to increase the promotion, method 500 proceeds to step 512, which adds to the variable "Promotion" and then proceeds to step 514 for display. If it is determined in step 510 that there is not factor indicating the need to increase the promotion, method 500 proceeds to step 514, and sends the variable "promotion" to mobile device 310 for display. If, for example, the advertiser had set or had advertised to the consumer a range of or guidelines for the promotion, the method of 500 may be designed so that the promotions stay within those set parameters.

Like method 500, method 600 will be described using system 200 of FIG. 2 and the components of processes 300 of FIG. 3, as described above, for discussion purposes only, but method 600 is not intended to be limited thereto. As shown in FIG. 6, method 600 includes steps 602, 604, 606, 608, 610, 612, and 614. However, it should be noted that method 600 may include more or fewer steps as desired for a particular implementation. In an example, one or more of the above-listed steps of method 600 may be executed by promotion determination server 240 of FIG. 2 or message server 340 of FIG. 3, as described above. However, method 600 is not intended to be limited thereto, and the steps of method 600 may be performed by any server or other type of computing device having at least one processor, a memory, and a network communication interface for sending and receiving information from one or more mobile devices. Method 600 contains a plurality of determined promotions. FIG. 6 illustrates an example of method 600 containing three determined promotions, but method 600 may include as little as two promotions or as many as advertisers designates.

Method 600 begins in step 602, which includes receiving and storing a first promotion, second promotion, and/or third promotion, wherein the third promotion is greater than the second promotion and the second promotion is greater than the first promotion. The first, second, and third promotions may be set by the advertiser, or randomly by the promotion determination server 350. Step 604 then includes receiving the current geographic location of the mobile device. It is first determined in step 606 whether there is a factor indicating the need to decrease the promotion, as described above. If it is determined that there is a factor indicating the need to decrease the promotion, method 600 proceeds to step 608, which sends the first promotion to the mobile device 310 for display. If in step 606 it is determined that there is not a factor indicating the need to decrease the promotion, method 600 proceeds to step 610 to determine whether there is a factor indicating the need to increase the promotion, as described above. If it is determined that there is a factor indicating the need to increase the promotion, method 600 proceeds to step 612, which the third promotion is sent to the mobile device 310 for display. If it is determined in step 610 that there is not factor indicating the need to increase the promotion, method 600 proceeds to step 612, and sends the second promotion to the mobile device 310 for display. Additional promotions can be added to method 600. For example, if more than one factor indicating a need to increase the promotion is present or is strongly weighed, an additional fourth promotion greater than the third promotion can be sent to the mobile device 310.

Method 700 will be described using system 200 of FIG. 2 and the components of processes 300 of FIG. 3, as described above, for discussion purposes only, but method 700 is not intended to be limited thereto. As shown in FIG. 7, method 700 includes steps 702, 704, 706, and 708. However, it should be noted that method 700 may include more or fewer steps as desired for a particular implementation. In an example, one or more of the above-listed steps of method 500 may be executed by promotion determination server 250 of FIG. 2 or promotion determination server 350 of FIG. 3, as described above. However, method 700 is not intended to be limited thereto, and the steps of method 700 may be performed by any server (e.g., coupon server 230 of FIG. 2 or coupon server 330 of FIG. 3) or other type of computing device having at least one processor, a memory, and a network communication interface for sending and receiving information from one or more mobile devices. Method 700 begins in step 702, which includes storing information related to the geo-fence associated with the coupon, which may have been previously identified based on the current geographic location of the mobile device, e.g., as determined by the advertiser server pursuant to steps 406 and 408 of method 400 of FIG. 4, a described above. Step 702 may also include storing a record of the time that the coupon was sent to the mobile device (e.g., in step 414 of method 400).

Method 700 then proceeds to step 704. It is first determined in step 704 whether the coupon has been redeemed. If the coupon was redeemed, method 700 proceeds to step 706, in which a set of redemption statistics (e.g., a success rate) for the coupon may be updated (e.g., increased or incremented by some predetermined value). In an example, if the success rate is above a threshold, that may indicate that the promotion should be decreased. In another example, if the success rate is below a threshold that may indicate that the promotion should be increase in order to increase the likelihood the next consumer will redeem the coupon.

However, if current geographic location of the mobile device is no longer in the geo-fence associated with the coupon and the coupon was not redeemed (in step 704), method 700 proceeds to step 708, which also includes updating the redemption statistics, so that a failure rate is updated (e.g., increased or incremented by some predetermined value). The failure rate may therefore indicate that the promotion should be increased.

In addition, the promotion associated with the redeemed (successful) and unredeemed (failed) coupons can also be stored. These redemption statistics may be used by the advertiser in a number of ways to determine future promotions. In a simplified example, the advertiser may extrapolate that the average promotion of the unredeemed coupons is not sufficient to drive sales and future promotions should be higher than that average. In another example, if the success rate is above a threshold, all promotions can be decreased or only promotions below the average promotion of the redeemed coupons should be awarded.

Figure 8:
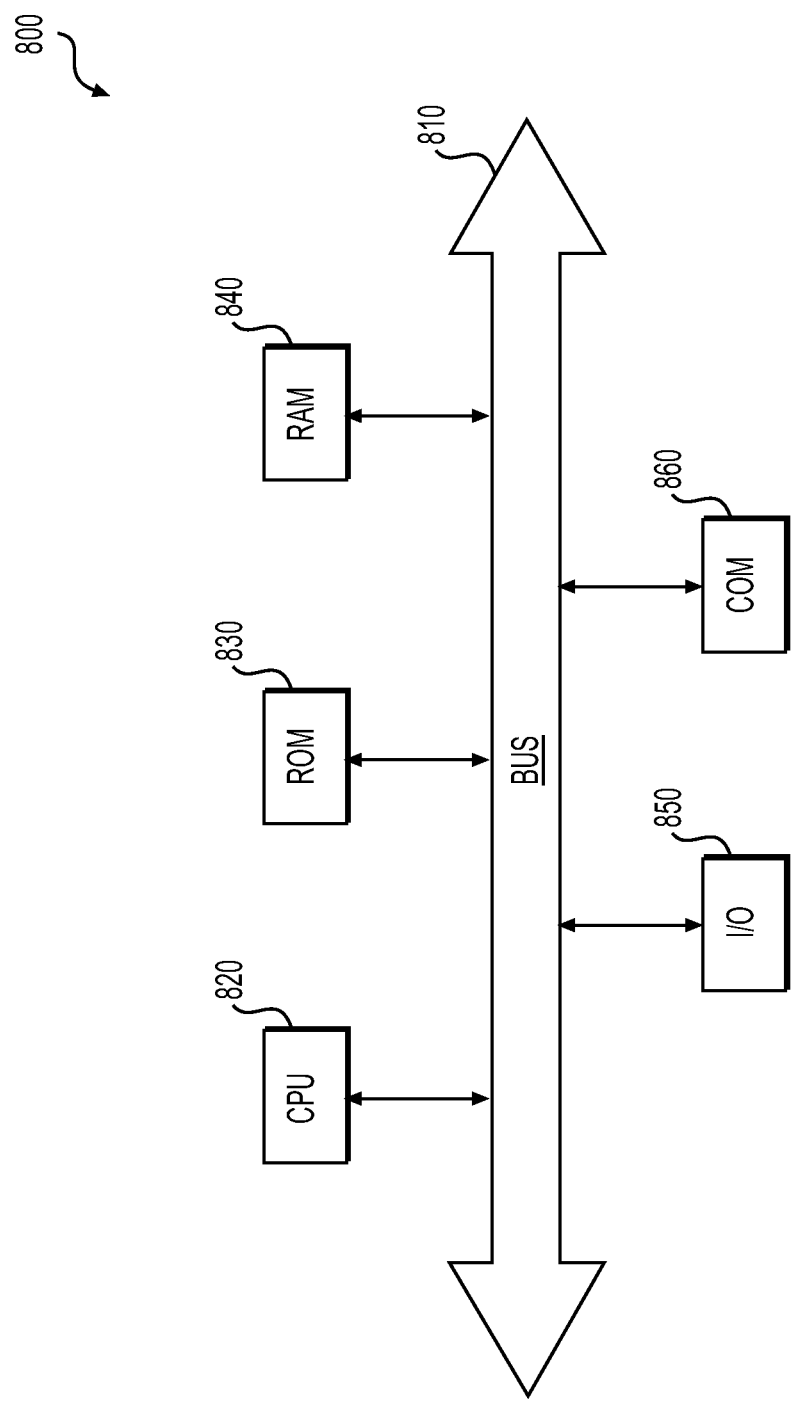
FIG. 8 is a block diagram of an exemplary computer system in which embodiments of the present disclosure may be implemented.

FIG. 8 provides a high-level functional block diagram illustrating an exemplary general purpose computer 800.

Computer 800 may be used to implement, for example, any of coupon server 230, advertiser server 240, or promotion determination server 250 of FIG. 2 in addition to coupon server 330, advertiser server 340, or promotion determination server 350 of FIG. 3, as described above. It is believed that those skilled in the art are familiar with the structure, programming and general operation of such computer equipment and as a result the drawings should be self-explanatory.

In an example, computer 800 may represent a computer hardware platform for a server or the like. Accordingly, computer 800 may include, for example, a data communication interface for packet data communication 860. The platform may also include a central processing unit (CPU) 820, in the form of one or more processors, for executing program instructions. The platform typically includes an internal communication bus 810, program storage and data storage for various data files to be processed and/or communicated by the platform such as ROM 830 and RAM 840, although the computer 800 often receives programming and data via network communications 870. The hardware elements, operating systems and programming languages of such equipment are conventional in nature, and it is presumed that those skilled in the art are adequately familiar therewith. Computer 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for delivery of digital coupons with dynamically determined promotions, the method comprising:
    transmitting, by a coupon server, a digital coupon with an undetermined promotion to a first mobile device of a consumer;
    receiving an indication that the digital coupon has been loaded on the mobile device of the consumer, and that the mobile device has connected to the coupon server;
    receiving an indication that an activating action has been performed on the first mobile device to activate the digital coupon, wherein the activating action includes revealing the digital coupon via a digital scratch-off on a display screen of the mobile device, and wherein the consumer interacts with a designated area of the digital scratch-off to reveal the digital coupon on the display screen of the first mobile device;
    requesting, by the coupon server, access to a current geographic location of the mobile device associated with the consumer, wherein the current geographic location of the mobile device is determined by Global Positioning System (GPS) location data;
    transmitting, by the mobile device, the current geographic location of the mobile device to the coupon server when access to the current geographic location is granted;
    transmitting, by the coupon server, the current geographic location of the first mobile device to an advertiser server;
    determining, at the advertiser server, whether the current geographic location of the mobile device is within each of a plurality of geo-fences associated with the digital coupon;
    upon determining that the current geographic location is outside of the plurality of geo-fences, comparing, at the advertiser server, the current geographic location of the mobile device to the plurality of geo-fences associated with the digital coupon to determine a first geo-fence of the plurality of geo-fences near the current geographic location, wherein a size and shape of the geo-fence is determined by an advertiser;
    transmitting, by the advertiser server, for display at the mobile device, a message instructing the consumer to visit the first geo-fence to reveal the undetermined promotion associated with the digital coupon;
    receiving, by the advertiser server, an updated current geographic location of the mobile device;
    when the updated geographic location of the mobile device is determined to be within the first geo-fence near the current geographic location, determining, at a promotion determination server, a first promotion associated with the digital coupon;
    sending the first promotion for display at the mobile device of the consumer;
    determining, at the promotion determination server, redemption information for the first promotion of the digital coupon;

comparing, at the promotion determination server, the redemption information against a predefined redemption rate threshold;

determining, at the promotion determination server, based on the comparison, a second promotion associated with the digital coupon; and sending the second promotion for display at the mobile device of the consumer, wherein at least one of the first promotion and the second promotion includes a boosting feature configured to enable the consumer to increase a respective value of the at least one of the first promotion and the second promotion by taking a boosting action before the at least one of the first promotion and the second promotion is revealed, wherein the boosting action includes at least one of i) watching a video related to the advertiser and ii) playing a game in which gaining a predetermined number of points corresponds to different promotion levels.

2. The method of claim 1, wherein sending the first promotion for display at the mobile device is performed via a message notification interface of an operating system of the mobile device.

3. The method of claim 1, wherein upon receiving an indication that an action related to the digital coupon was performed, requesting a current geographic location of the mobile device via a communication network.

4. The method of claim 1, wherein the current geographic location of the mobile device is repeatedly updated until the current geographic location of the mobile device is determined to be within the first geo-fence associated with the digital coupon.

5. The method of claim 1, further comprising:
determining that the first geo-fence of the plurality of geo-fences is the shortest distance from the current geographic location of the mobile device; and
sending for display to the first mobile device directions to the first geo-fence from the current geographic location of the first mobile device.

6. The method of claim 1, further comprising:
determining that the first geo-fence of the plurality of geo-fences is the shortest distance from a geographic location associated with the mobile device; and
sending for display to the mobile device directions to the first geo-fence from the geographic location associated with the first mobile device.

7. The method of claim 1, wherein the first promotion is determined based on time.

8. The method of claim 1, wherein the first promotion is determined based on an action taken by the consumer of the mobile device.

9. The method of claim 1, wherein once a threshold number of digital coupons are redeemed, the value of the digital coupon is decreased.

10. The method of claim 1, wherein the first promotion is determined based on the first geo-fence associated with the digital coupon.

11. The method of claim 1, wherein the first promotion is a variable promotion, wherein when it is determined that there is a factor indicating the need to decrease the first promotion, subtracting value from the variable promotion, and wherein when it is determined that there is a factor indicating the need to increase the first promotion, adding value to the variable promotion.

12. The method of claim 1, wherein the first promotion is determined based on current sales data.

13. The method of claim 1, wherein the digital coupon with the undetermined promotion is provided to the consumer via an in-app push notification.

14. The method of claim 1, wherein the digital coupon with the undetermined promotion is provided to the first consumer via a desktop-based advertising unit.

15. A system for delivery of digital coupons with dynamically determined promotions, the system comprising:
a data storage device having processor-readable instructions stored therein; and
a processor configured to execute the processor-readable instructions to perform a method including the steps of:
transmitting, by a coupon server, a digital coupon with an undetermined promotion to a mobile device of a consumer;
receiving an indication that the digital coupon has been loaded on the mobile device of the consumer, and that the mobile device has connected to the coupon server;
receiving an indication that an activating action has been performed on the mobile device to activate the digital coupon, wherein the activating action includes revealing the digital coupon via a digital scratch-off on a display screen of the mobile device, and wherein the consumer interacts with a designated area of the digital scratch-off to reveal the digital coupon on the display screen of the mobile device;
requesting, by the coupon server, access to a current geographic location of the mobile device associated with the consumer, wherein the current geographic location of the mobile device is determined by Global Positioning System (GPS) location data;
transmitting, by the mobile device, the current geographic location of the mobile device to the coupon server when access to the current geographic location is granted;
transmitting, by the coupon server, the current geographic location of the mobile device to an advertiser server;
determining, at the advertiser server, whether the current geographic location of the mobile device is within each of a plurality of geo-fences associated with the digital coupon;
upon determining that the current geographic location is outside of the plurality of geo-fences, comparing, at the advertiser server, the current geographic location of the mobile device to the plurality of geo-fences associated with the digital coupon to determine a first geo-fence of the plurality of geo-fences that is near the current geographic location, wherein a size and shape of the geo-fence is determined by an advertiser;
transmitting, by the advertiser server, for display at the mobile device, a message instructing the consumer to visit the first geo-fence to reveal the undetermined promotion associated with the digital coupon;
receiving, by the advertiser server, an updated current geographic location of the mobile device;
when the updated geographic location of the mobile device is determined to be within the first geo-fence near the current geographic location, determining, at a promotion determination server, a first promotion associated with the digital coupon;
sending the first promotion for display at the mobile device of the consumer;
determining, at the promotion determination server, redemption information for the first promotion of the digital coupon comparing, at the promotion determination server, the redemption information against a predefined redemption rate threshold;

determining, at the promotion determination server, based on the comparison, a second promotion associated with the digital coupon; and sending the second promotion for display at the mobile device of the consumer, wherein at least one of the first promotion and the second promotion includes a boosting feature configured to enable the consumer to increase a respective value of the at least one of the first promotion and the second promotion by taking a boosting action before the at least one of the first promotion and the second promotion is revealed, wherein the boosting action includes at least one of i) watching a video related to the advertiser and ii) playing a game in which gaining a predetermined number of points corresponds to different promotion levels.

16. The system of claim 15, wherein the first promotion is a variable promotion, wherein when it is determined that there is a factor indicating the need to decrease the first promotion, subtracting value from the variable promotion, and wherein when it is determined that there is a factor indicating the need to increase the first promotion, adding value to the variable promotion.

17. A non-transitory computer readable medium storing instructions that, when executed by a computer, cause the computer to perform functions to:

transmit, by a coupon server, a digital coupon with an undetermined promotion to a mobile device of a consumer;

receive an indication that the digital coupon has been loaded on the mobile device of the consumer, and that the mobile device has connected to the coupon server;

receive an indication that an activating action has been performed on the mobile device to activate the digital coupon, wherein the activating action includes revealing the digital coupon via a digital scratch-off on a display screen of the mobile device, and wherein the first consumer interacts with a designated area of the digital scratch-off to reveal the digital coupon on the display screen of the mobile device;

request, by the coupon server, access to a current geographic location of the mobile device associated with the consumer, wherein the current geographic location of the mobile device is determined by Global Positioning System (GPS) location data;

transmit, by the mobile device, the current geographic location of the mobile device to the coupon server when access to the current geographic location is granted;

transmit, by the coupon server, the current geographic location of the first mobile device to an advertiser server;

determine, at the advertiser server, whether the current geographic location of the mobile device is within each of a plurality of geo-fences associated with the digital coupon;

upon determining that the current geographic location is outside of the plurality of geo-fences, compare, at the advertiser server, the current geographic location of the first mobile device to the plurality of geo-fences associated with the first digital coupon to determine a first geo-fence of the plurality of geo-fences that is near the current geographic location, wherein a size and shape of the geo-fence is determined by an advertiser;

transmit, by the advertiser server, for display at the mobile device, a message instructing the consumer to visit the first geo-fence to reveal the undetermined promotion associated with the digital coupon;

receive, by the advertiser server, an updated current geographic location of the mobile device;

when the updated geographic location of the mobile device is determined to be within the first geo-fence near the current geographic location, determine, at a promotion determination server, a first promotion associated with the digital coupon;

send the first promotion for display at the mobile device of the consumer;

determine, at the promotion determination server, redemption information for the first promotion of the digital coupon;

compare, at the promotion determination server, the redemption information against a predefined redemption rate threshold;

determine, at the promotion determination server, based on the comparison, a second promotion associated with the digital coupon; and send the second promotion for display at the mobile device of the consumer, wherein at least one of the first promotion and the second promotion includes a boosting feature configured to enable the consumer to increase a respective value of the at least one of the first promotion and the second promotion by taking a boosting action before the at least one of the first promotion and the second promotion is revealed, wherein the boosting action includes at least one of i) watching a video related to the advertiser and ii) playing a game in which gaining a predetermined number of points corresponds to different promotion levels.

18. The non-transitory computer readable medium of claim 17, wherein the first promotion is a variable promotion, wherein when it is determined that there is a factor indicating the need to decrease the first promotion, subtract value from the variable promotion, and wherein when it is determined that there is a factor indicating the need to increase the first promotion, add value to the variable promotion.

* * * * *